Aug. 15, 1933.   A. R. NYQUIST   1,922,692
FLUX
Filed March 25, 1930
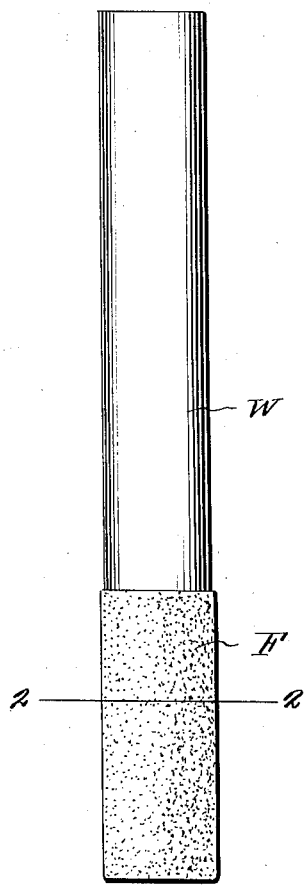
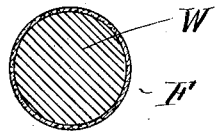
Inventor
AUGUST R. NYQUIST
By Irving L. McCathran
Attorney Patented Aug. 15, 1933

1,922,692

UNITED STATES PATENT OFFICE 1,922,692

FLUX

August R. Nyquist, Roseau, Minn.

Application March 25, 1930. Serial No. 438,834

1 Claim. (Cl. 148—26)

My invention relates to a flux for electric arc welding, which can be successfully used on either cast iron or steel electrodes for welding on cast iron and on steel.

One of the primary objects of my invention is to provide a flux in which the ingredients will act to carry the electric arc and make a close grained weld, which will be stronger or at least as strong as the original piece.

Another important object of my invention is the provision of a flux which will eliminate all blow holes and the like in the weld and produce a close grained bond.

A further object of my invention is to provide a flux that can be used for coating electrodes to be used in electric arc welding, the coated electrodes being sold on the market as articles of manufacture.

In the drawing:

Figure 1 is a side elevation of a welding rod showing one end of the same coated with my flux, and Figure 2 is a section through the same taken on the line 2—2 of Figure 1.

My flux consists of a mixture of four ingredients, namely: calcium carbonate, magnesium sulphate, potassium nitrate, and magnesium carbonate.

In preparing my flux, I prefer to use the above ingredients in about the following proportions—viz., one part magnesium sulphate, one part potassium nitrate, one part calcium carbonate, and one part magnesium carbonate. These proportions may be slightly changed without materially altering the general properties of the flux.

The magnesium sulphate and the potassium nitrate are first dissolved in water, and the calcium carbonate and magnesium carbonate are afterwards added and mixed into the solution. The flux can be used in its liquid state and poured on the parts to be welded or can be applied with a brush and allowed to dry.

I prefer, however, to apply my flux to commercial welding rods, indicated by the reference character W in the drawing, and to place the flux coated rods on the market, in a general way. After the four ingredients have been mixed together as outlined above, the rods W are dipped into the solution and dried. After drying, the rods will then be placed in an oven and baked in a temperature from 250 to 450 degrees Fahrenheit. This baking process has the effect of thoroughly cementing the flux, indicated by the reference character F in the drawing, to the rods, the ingredients of the flux forming their own binder, rendering any additional agent for this purpose unnecessary.

I lay particular stress on the ingredients used, as the same combine together to bring about the desired result. The calcium carbonate, as an agent in the flux, intensifies the heat in the arc and combining with the base metal, lowers the melting point of the same, besides greatly assisting in maintaining the electric arc.

The potassium nitrate assists in maintaining the electric arc, and, in conjunction with the calcium carbonate, tends to eliminate most of the impurities in the iron. These impurities form gases, which are responsible for blowholes in the weld. The object of the flux is to combine with the impurities, thereby eliminating them from the iron.

The magnesium sulphate serves to very greatly intensify the heat at the arcing point, and results in a constant series of mild explosions at that point, which causes the molten metal from the rod to be deposited with considerable force upon the base metal. This ingredient also forms an almost perfect flux only needing an agent to carry the arc. The magnesium sulphate and the potassium nitrate work well together, performing all the necessary functions of arc welding, but the addition of the calcium carbonate increases the heat, causes a smoother action in the flow of metal, and is an important agent in helping to carry the electric arc.

The magnesium carbonate increases the number of small explosions at the arcing point and gives the metal of the electrodes a more even flow to the base metal. The substance also improves and hastens the process of fluxing the rods. The magnesium sulphate has the effect of forming an air-tight coating on the rods, which retards drying. The addition of the magnesium carbonate causes this film or coating to be broken up, and permits of more rapid drying, as well as tending to produce a smoother finished rod.

With the use of my flux, there is no burning of the flux and no resulting action of the flux on the electrode, until the flux is subjected to the intense heat of the electric arc. The flux does not burn, smoke, or peel on the rod, but adheres to the rod right into the arc. The flux contains a large amount of oxygen and as this oxygen is not used or burned above the arcing point, or on the rod, which is comparatively free from impurities anyway, the oxygen is all used in burning up the impurities in the base metal, preventing their forming a liner between the base metal and the deposited material. Heat alone will not break up a graphite liner, therefore, I must use some flux containing plenty of oxygen which has an affinity for carbon and graphite combining with them and converting them into a slag, which floats on the surface of the weld, and prevents oxidation of the heated metal. My flux possesses these characteristics.

Steel has a melting point of between 2800 and 3000 degrees Fahrenheit, while cast iron melts at 2300 degrees. This difference will cause the steel to solidify at a heat in which the cast iron remains in a perfectly molten state. It is the contraction of the steel, while the cast iron is on the verge of the melting point, that causes the checks and cracks in a finished weld.

My flux permits the metal of the cast iron electrode to be left in its natural condition, and allows the welding operation to progress just as rapidly as the section to be welded will permit; that is, without melting so much of it, as to allow it to run off. If the material or piece to be welded will hold the molten metal, or is dammed up to prevent it from running away, there is no limit to the speed of the weld, except the size of the rod, and the amperage used. My flux keeps the cast iron in its original state, and the action is the same in pouring a casting in a foundry.

By the use of my flux, I am enabled to do both vertical and overhead welding, something that can not be done with any other flux within my knowledge, due to the dropping of the metal from the weld rod.

From the foregoing, it can be seen that I have provided a flux in which the ingredients thereof are easy to obtain and which are easily compounded and put upon the market at a small cost, and which flux is capable of being applied to and baked on the welding rods.

What I claim as new is:

A flux for electric arc welding comprising magnesium sulphate, potassium nitrate, calcium carbonate, and magnesium carbonate, all in substantially equal proportions.

AUGUST R. NYQUIST.